No. 672,136. Patented Apr. 16, 1901.
R. F. STEWART.
BUTTER CUTTER.
(Application filed June 15, 1900.)
(No Model.) 2 Sheets—Sheet 2.
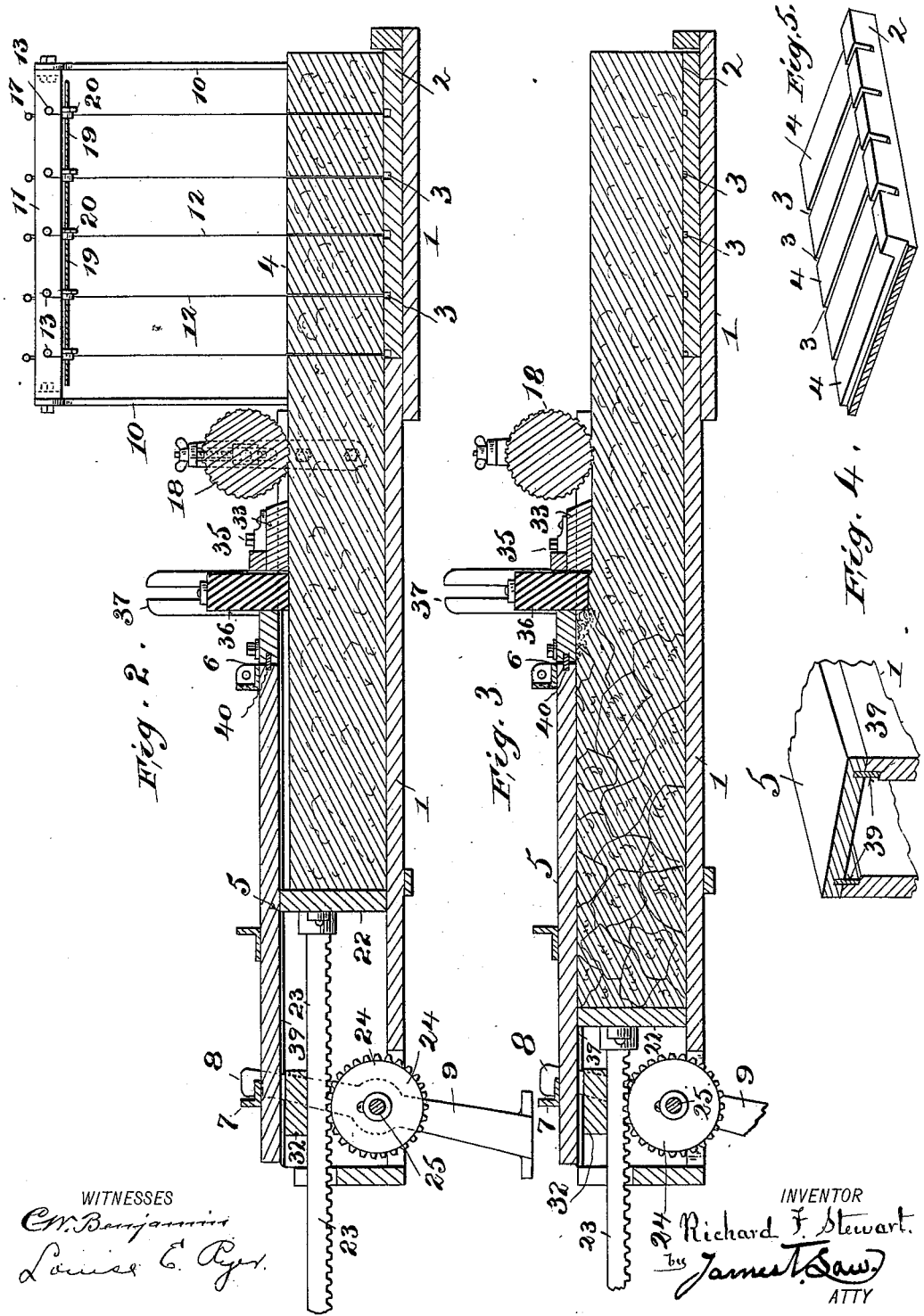

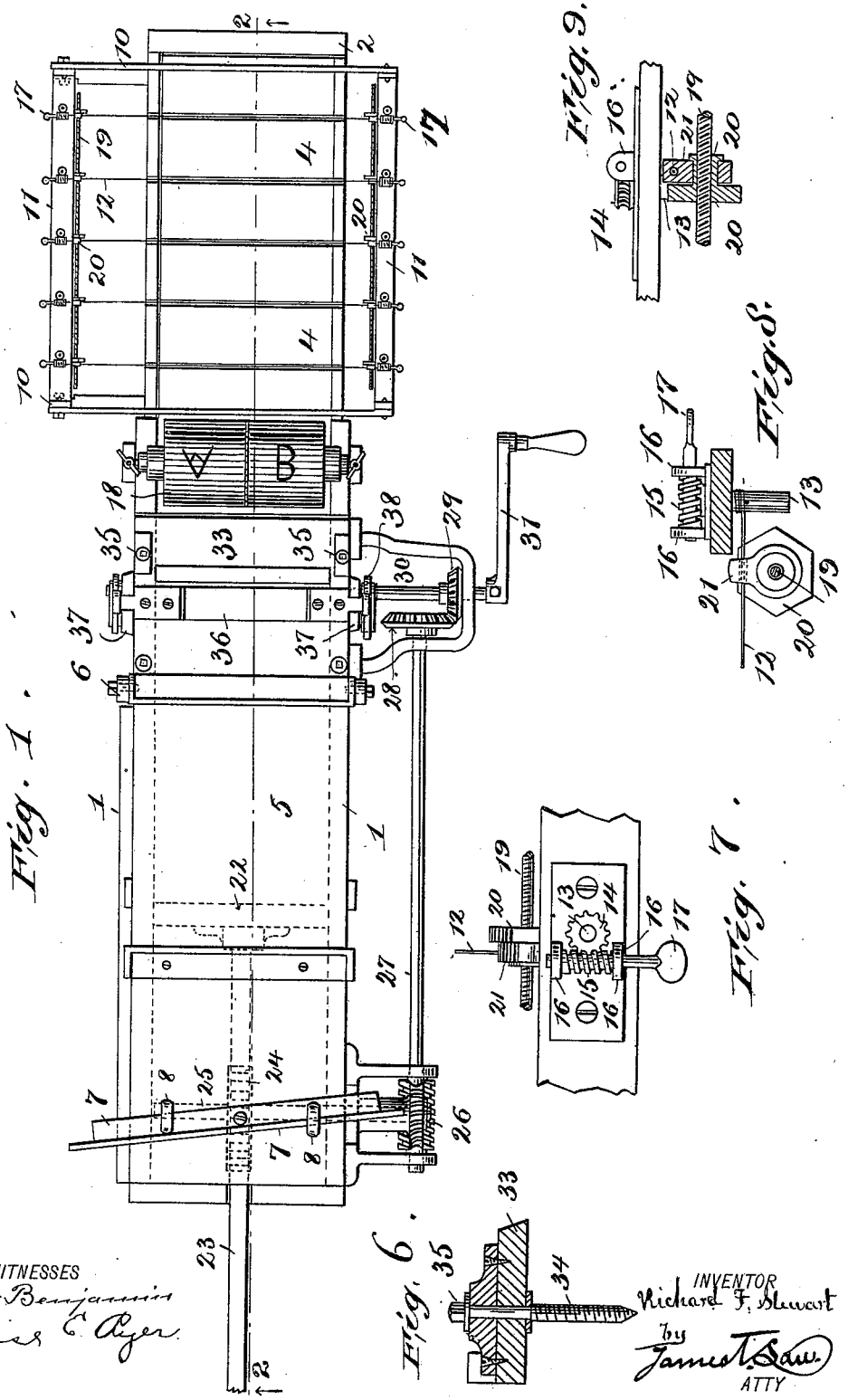

UNITED STATES PATENT OFFICE.

RICHARD F. STEWART, OF MOUNT PLEASANT, NEW YORK.

BUTTER-CUTTER.

SPECIFICATION forming part of Letters Patent No. 672,136, dated April 16, 1901.

Application filed June 15, 1900. Serial No. 20,412. (No model.)

*To all whom it may concern:*

Be it known that I, RICHARD F. STEWART, a citizen of the United States of America, and a resident of the town of Mount Pleasant, county of Westchester, State of New York, have invented certain new and useful Improvements in Butter-Cutters, of which the following is a specification.

In a former application for butter-cutters, filed by me November 22, 1899, Serial No. 737,860, I described a machine for cutting the block or package of butter into long strips and then cutting these strips into small blocks or prints ready for the consumer. This improvement is designed to cut these long strips as they are previously cut or formed into the small blocks or prints without compressing or packing the same, and, moreover, is also designed to form or mold the long strips of butter when desired from small pieces or ends of butter and afterward cut the same into the small blocks or prints; and the invention consists in the constructions and combinations set forth in the claims herewith.

In the accompanying drawings, forming a part of this specification, Figure 1 is a plan view of the cutting-machine, showing the cutters down, in the position they assume when they have cut through the butter. Fig. 2 is a longitudinal section through the line 2 2, Fig. 1, showing the strip of butter in the machine and the cutters raised after they have cut through the butter. Fig. 3 is the same as Fig. 2, showing the machine forming the butter into the strip for cutting. Fig. 4 is a detail showing the construction of the lid of the machine. Fig. 5 is a view of the detachable tray on which the strip of butter rests when it is cut. Fig. 6 is a detail sectional view of the gage or regulator by which the size of the blocks of butter is regulated. Figs. 7, 8, and 9 are detail views of the adjusting mechanism for tightening and regulating the cutting-wires.

In my previous application above I have stated the advantage of cutting the butter into blocks or prints instead of pressing it in molds or forms, as by such cutting the fiber or grain of the butter is not injured, as it is by the pressing and working over of the butter, and, furthermore, the water or juice in the butter is not pressed out.

Referring to the drawings, 1 is an oblong box slightly longer than the strip of butter previously cut and of an interior width equal to the length of the small block of butter when cut and of a depth a little greater than the depth or height of such small block. One end of the box is open its entire width and depth, and beyond this open end is a tray or platform 2, on which the butter rests when it is cut and which is divided by cross slits or depressions 3 into spaces 4 the width of the butter block when cut. The top 5 of the box is hinged at 6, and through the door thus formed the previously-cut strip of butter or the small pieces of butter, as described below, are inserted into the box. The door is held down on the sides of the box and against the pressure of the butter within by the swinging brace or piece 7, which fits under the hooks 8 on the top of the standards 9, by which the apparatus is supported and which extend up through the box and through openings in the door above the latter.

The cutting mechanism consists of a metallic frame 10 11, hinged by one horizontal side 11 to the frame supporting the cutting-tray and alongside and back of the latter in such manner that the frame can be turned up and back in a vertical position, as shown in Fig. 2, or brought down horizontally across the tray, as in Fig. 1. Between the horizontal sides 11 of the frame are strung the cutting-wires 12, by which the butter is cut. In the particular construction shown in the drawings the ends of these cutting-wires are connected to and wrapped around stems 13, journaled in the sides 11 of the frame. The upper ends of these stems above the sides terminate in wheels 14, which engage with worm-screws 15, supported by lugs 16 on the sides 11 and turned by the keys 17. As will be evident from Figs. 7 and 8, as the keys are turned in either direction the worm-screws, engaging with the wheels 14, turn the stems 13 to tighten or loosen the cutting-wires, and thus regulate the tension of the latter at pleasure and as is found necessary.

It is sometimes desirable to shift the cutting-wires sidewise in the frame, and thus regulate their position in cutting the butter in order that each block of butter when cut shall weigh the same and shall have the exact weight desired, and, further, that the position of the wires shall correspond with the division-marks made on the top of the butter by the marking-wheel 18. This side-shifting of the wires is effected by the following mechanism: To the inner side of each of the horizontal sides 11 of the frame is secured a fixed screw-bar 19, mounted on which are a series of screw-sleeves 20. These screw-sleeves carry a loose piece 21, through one end of which passes the cutting-wire 12. As will be seen from Fig. 9, as the screw-sleeve 20 is turned on the screw-bar 19 the loose piece 21, and consequently the wire connected to it, is moved to one side or the other in the frame, and as these adjusting-pieces are on both sides of the frame the wires can be evenly adjusted and their position regulated at pleasure.

On the end of the box in front of the cutting frame and tray is a marking-roller 18, adjustably mounted in suitable bearings, whereby its pressure on the butter may be regulated. This wheel, which is revolved by the butter as it passes through the box, impresses on the top of the butter the division-marks between the several blocks and any device or particular marking desired.

The strip or long block of butter is pushed from the box and onto the cutting-tray by the piston-head 22, to which is attached the rack 23, which engages with the pinion 24, mounted on the shaft 25. This shaft 25 is journaled in the standards 9, extending up through the ends of the box, and is revolved by engagement at one end with the worm-gear 26 on the horizontal shaft 27, extending along the outside of the box, and engaging, by means of the bevel-gears 28 and 29, with the shaft 30, operated by the crank 31. As will be understood from the drawings, as the crank is turned in the proper direction the head 22 is forced to slide in the box toward the open end of the latter and pushes the butter out on the cutting-tray. The rack 23 is held down and in engagement with the pinion by the block 32 on the under side of the door 5, which presses down on the rack when the door is closed and insures the engagement of the rack and pinion.

The strip of butter previously cut from the butter from the box or tub in which it is packed and which is to be further cut by this apparatus into small blocks is intended to be of such a thickness that when cut up into the small blocks each block will have an exact given weight—one pound or two pounds, as the case may be. It is sometimes found, however, that blocks of the same size will vary in weight. In such cases it is necessary to adjust or regulate the thickness of the strip of butter in the box before it passes from the latter onto the tray to be cut. This is accomplished by the gage or adjusting device shown in Fig. 6 in connection with the packing mechanism described farther on. This gage consists, in the construction here shown, of a movable section of the top of the box immediately back of the marking-roller, which can be raised or depressed in such manner as to increase or diminish the height of the box below it. This movable section 33 (shown more enlarged in Fig. 6) extends across the box and is attached to the sides of the latter by the adjusting-screws 34, turned by the nuts 35. If it is found that the small block of butter when cut by the cutting-frame 10 11 weighs more than the desired weight, the regulating-section 33 is screwed down by turning the nuts 35, so as to press down on the butter below, as is shown in Fig. 3. As the butter is now pushed through the box the lowered regulating-section 33 scrapes off or removes some of the butter from the top of the strip or block, reducing the size, and consequently the weight, of the cut block to the weight desired. If the block of butter be below the desired weight, the regulating-section 33 is raised the required distance and some loose butter is placed on top of the butter in the box and is there pressed into or incorporated with the strip of butter, before the latter passes onto the cutting-tray, by the plunger or presser 36, described below, the gage 33 determining the height of the butter to give the desired weight.

When the box is filled with the single strip of butter as it is cut from the butter in the firkin or box in which it is packed, as is shown in Fig. 2, this cutting apparatus merely pushes the butter on the cutting-tray, marking it with the marking-roller as it passes along, and cuts it into the desired small blocks by the cutting-frame 10 11, as before described, and the butter is not compressed or packed in any manner by the machine. In place, however, of the single strip of butter the box may be filled with small pieces of butter, consisting of the ends and side pieces cut from the round package of butter as it comes from the tub or firkin, as shown in Fig. 3. In this case the apparatus first compresses these small irregular pieces into a single strip or long block, which is pushed onto the tray and cut into small blocks, as before described. This pressing or forming of the single long strip from the small pieces of butter in the box is effected by the vertical-moving plunger or presser 36. This consists of a wooden plunger the width of the interior of the box, mounted in suitable uprights 37, so as to slide up and down therein and press down on the surface of the butter beneath. The up-and-down motion is imparted to the plunger by the eccentric wheel 38, revolved by the shaft 30. Referring to Fig. 1, it will be seen that as the crank is turned to push the butter through the box by means of the piston-head 22 the shaft 30 revolves the eccentric wheel 38 and raises and draws down the plunger, pressing the butter beneath the same and forming it into a solid homogeneous strip. As the motion of the butter through the box is continuous, the up-and-down movement of the plunger should be rapid enough to press every portion of the butter as it passes through the box and at the same time not retard its forward movement, and, furthermore, this pressure should be only sufficient to weld the pieces of butter together into the single solid strip or block and not sufficient to destroy the grain of the butter.

In the operation of passing the butter through the box, and especially when small pieces of butter are compressed to form the single strip, some of the water or "juice" of the butter is pressed out of the latter. It is very desirable that this water be retained in the box in order that it may be reabsorbed or taken up again by the butter before the latter leaves the box. On the under side of the door 5 are inserted metal strips 39, Fig. 4, which fit into recesses in the sides of the box when the door shuts down and prevent the escape of the liquid that may be pressed from the butter. A similar metal strip 40 is inserted in the end of the door at the hinge and fits into a recess in the top of the box and prevents the escape of liquid at this point.

The operation of this apparatus is as follows: The package of butter as it comes in the round tub or firkin or square box is first cut into long strips or blocks by the vertical cutter described in my application above or by any other suitable apparatus. One of these strips or long blocks is then placed in the box of this cutting apparatus, and the door being closed the strip is pushed through the box by turning the crank 31, which, as before described, operates the shaft 27 and rack and pinion 23 24. As the crank is turned to push the butter through the box it moves the plunger 36 up and down by the eccentric wheel 38; but as the strip of butter is just the height and size desired the plunger on its downward stroke merely touches the surface of the butter and does not press it, as is seen in Fig. 2. It will be observed, therefore, that in this operation the plunger performs no office whatever and the butter is not compressed in any manner, the plunger merely moving up and down as the strip of butter passes under it. The strip of butter thus pushed from the box passes under the marking-roller 18, by which it is impressed with the division-marks and the device desired and is received on the cutting-tray 2. As the strip of butter reaches the end of the tray the motion of the crank, and consequently the forward movement of the butter, is stopped. The cutting-frame 10 11 is now turned down in the position shown in Fig. 1 and the the cutting-wires 12 forced through the butter, cutting the latter in small rectangular blocks, each consisting of the desired weight of butter. The cutting-frame is then thrown back and the tray, Fig. 5, with the blocks of butter, is removed from the apparatus. If the blocks of butter are found to weigh too much, the gage 33 is screwed down and the size of the following strip of butter reduced, so as to give the correct weight, while if the weight of the block is found to be less than is desired the gage is raised and some butter added to the top of the strip and pressed and incorporated into the latter by the pressure of the plunger, which now in its downward course movement presses the loose butter into the strip or block.

When it is desired to use small pieces of butter and form them into a long strip or block which can be cut into the desired size and weight of small blocks, the small pieces are packed into the box, as shown in Fig. 3, and the door 5 shut and held down by the cross-piece 7 and the mass pushed forward, as before. As the pieces of butter pass under the plunger 36 they are pressed and molded by the latter into a solid block, which is received on the tray 2 and cut by the cutting-frame, as before.

As will thus be seen in this improved apparatus, the long strip of butter previously cut from the butter as packed in the tub or box is cut into small blocks of the desired size and always of a given weight and without being compressed or packed, and, further, when desired small pieces or ends of butter are molded or formed into long strips, which are cut into the desired-size blocks, and in all cases the packing or pressing of the butter when necessary is effected by a series of pats or blows on top of the strip of butter resembling the pats given by the hand-ladle in the hands of the butter-worker, and hence without injuring the grain of the butter or pressing out the juice or water.

While the apparatus described herein and shown in the drawings is that which I deem preferable, I do not wish to confine myself to the exact details of construction shown, as the construction may vary without departing from the spirit of my invention and the cutter or cutting-frame may be formed and operated different from that shown and described.

What I claim is—

1. In a butter-cutter, in combination, a longitudinal box open at one end, adapted to receive the butter; reciprocating packing mechanism on the box by which the butter in the box is molded into a continuous strip; mechanism by which the butter is caused to pass through the box and out at the open end of the same; and a cutting-frame arranged to cut the strip of butter from the box, substantially as described.

2. In a butter-cutter, in combination, a longitudinal box, open at one end, adapted to receive the butter; reciprocating packing mechanism on the box by which the butter in the box is molded into a continuous strip; means on the box whereby the size of the strip is regulated, and an excess of butter removed from the strip; mechanism by which the butter is caused to pass through the box and out from the open end of the same; and a cutting-frame arranged to cut the strip of butter from the box, substantially as described.

3. In a butter-cutter, in combination, a longitudinal box, open at one end, adapted to receive the butter; reciprocating packing mechanism on the top of the box by which the butter in the box is molded in a continuous strip; means on the box whereby the size of the strip is regulated, and an excess of butter removed; mechanism by which the butter is caused to pass through the box and out from the open end of the same; and a cutting-frame having cutting-wires, and provided with means whereby the wires are shifted, by which the strip of butter from the box is cut, substantially as described.

4. In a butter-cutter, in combination, the box 1 open at one end and adapted to receive the butter; reciprocating packer 36 on top of the box; regulating-gage 33, mechanism by which the butter is pushed from the open end of the box; and cutting-frame 10, 11, substantially as described.

5. In a butter-cutter, consisting of a horizontal box through which the butter is passed, a vertical reciprocating packing mechanism on the box, arranged and adapted to press the butter when above a certain height in the box, substantially as described.

RICHARD F. STEWART.

Witnesses:
LOUISE E. RYER,
DAVID M. WOLFF.